Jan. 28, 1964  B. O. BURRITT  3,119,507
ELECTRIC TOOL
Filed Oct. 19, 1961  3 Sheets-Sheet 1
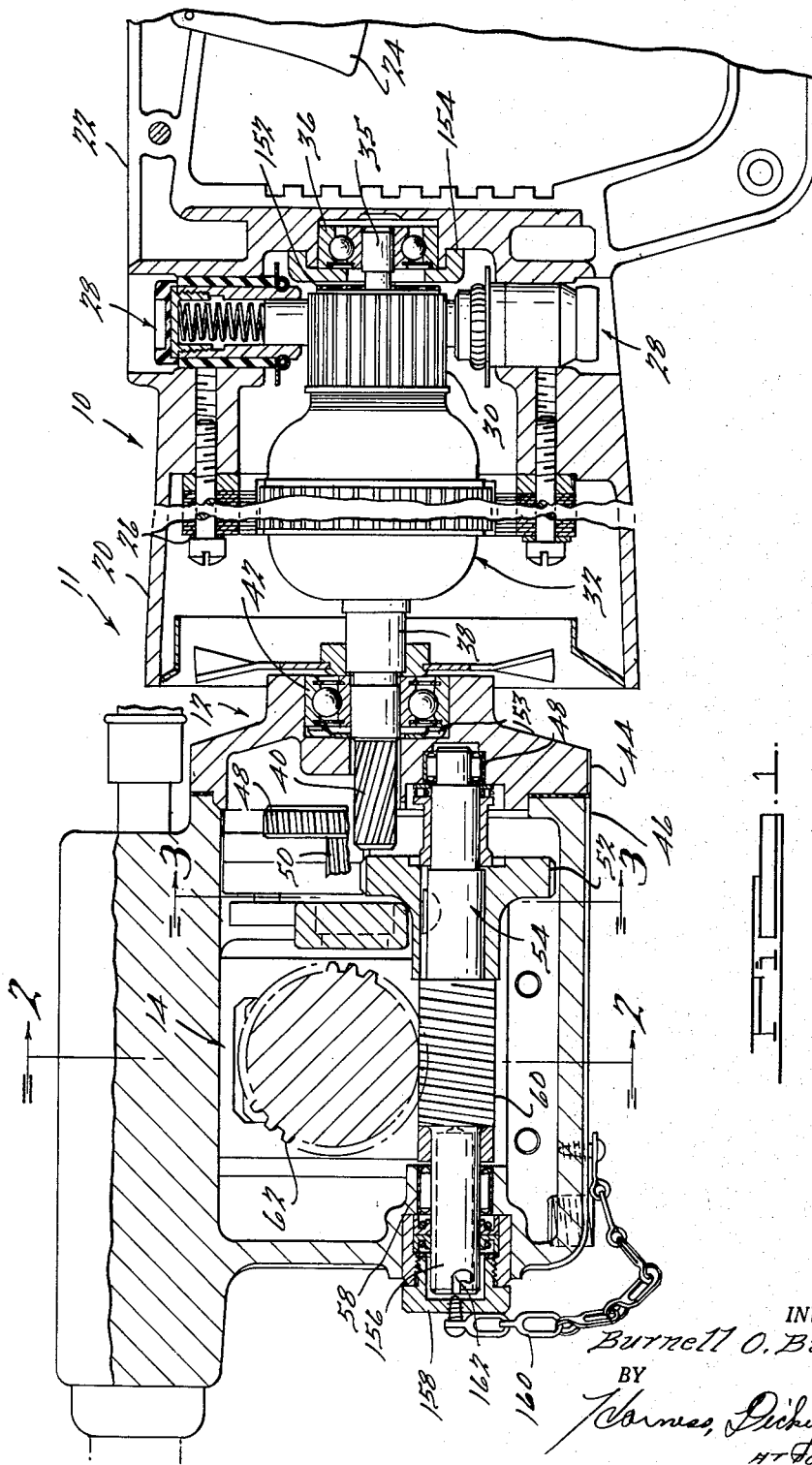
INVENTOR.
Burnell O. Burritt
BY
Barnes, Dickey & Pierce
ATTORNEYS.

Jan. 28, 1964  B. O. BURRITT  3,119,507
ELECTRIC TOOL
Filed Oct. 19, 1961  3 Sheets-Sheet 2
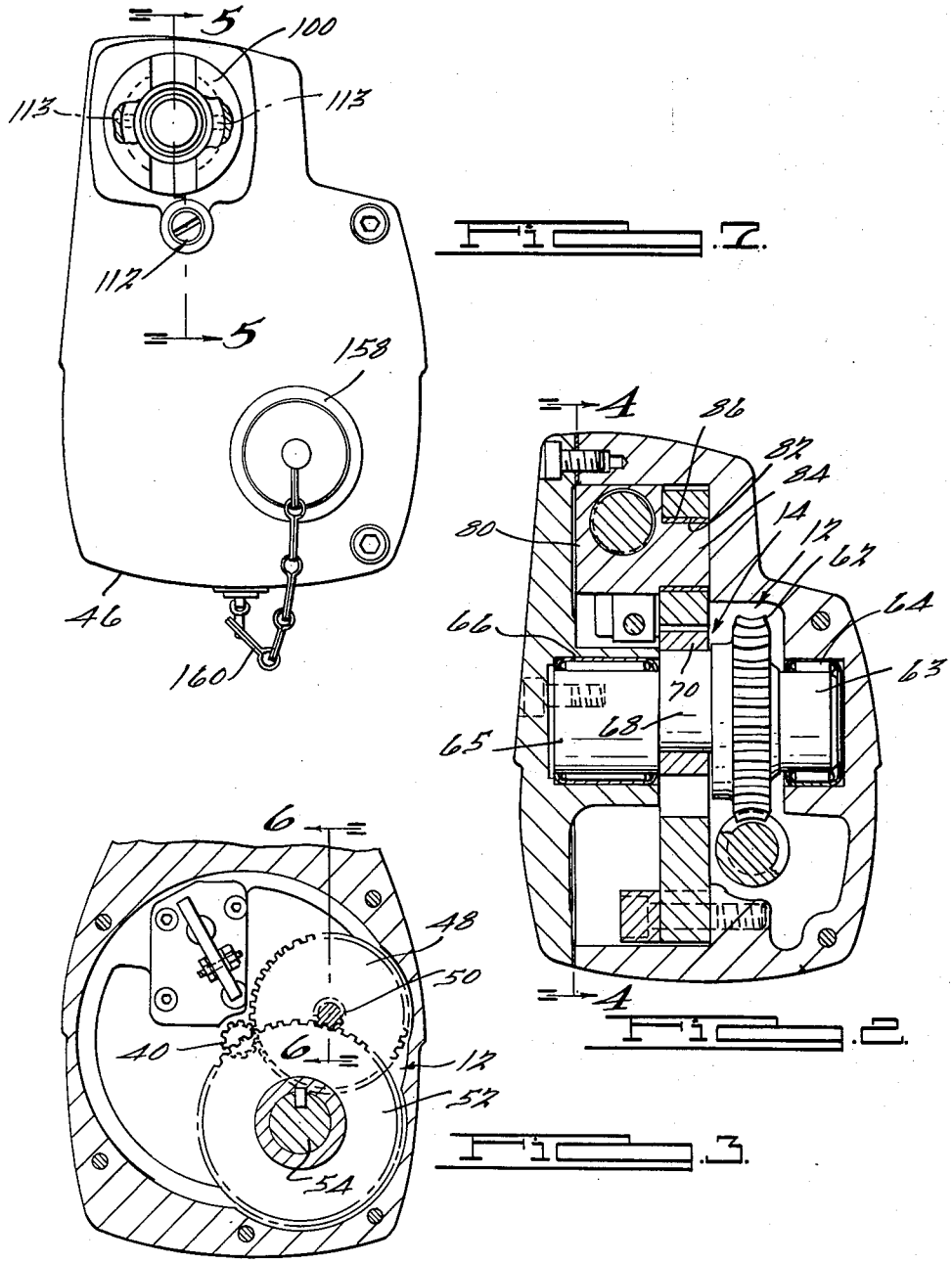
INVENTOR.
Burnell O. Burritt
BY
Harness, Dickey & Pierce
ATTORNEYS

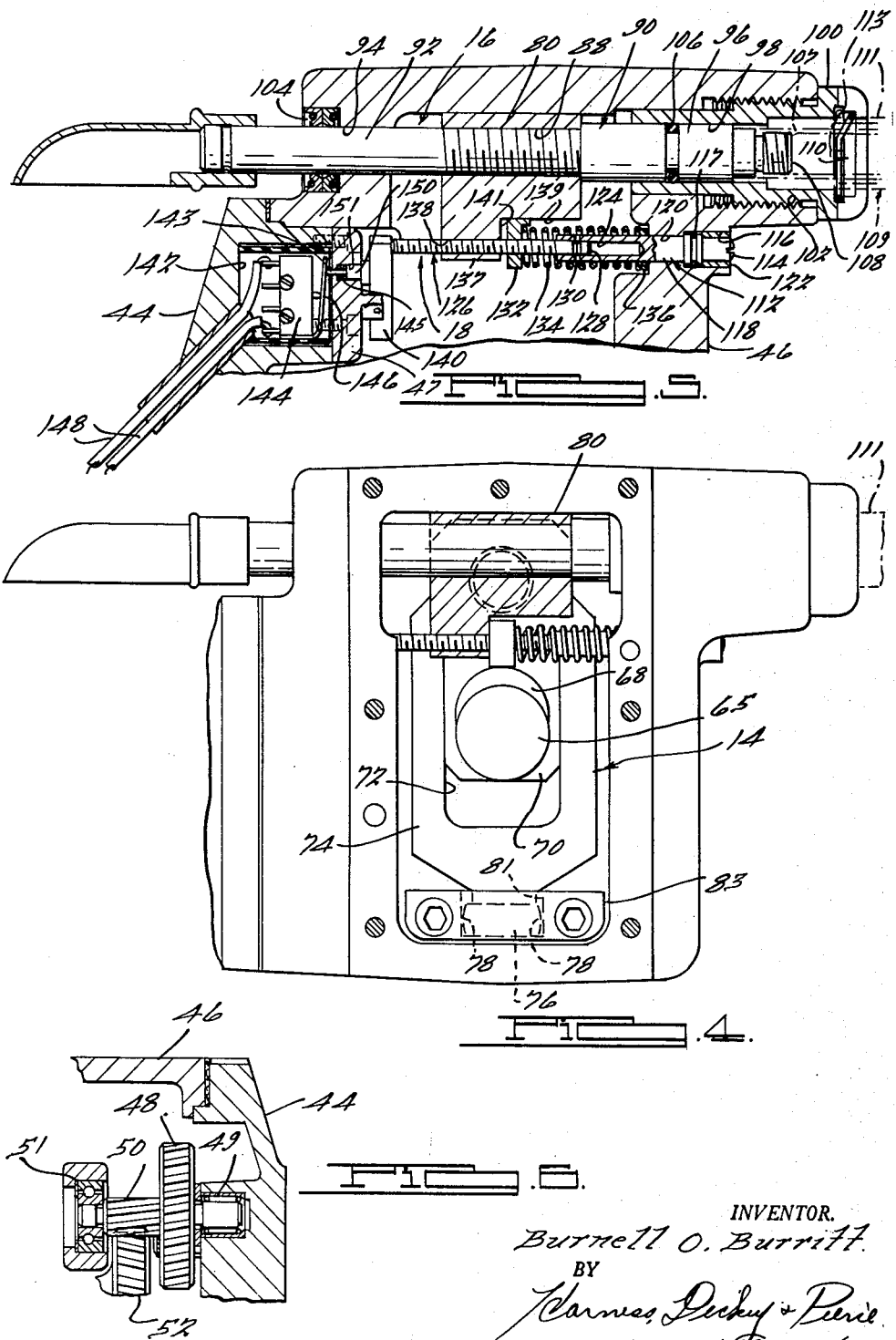

United States Patent Office 3,119,507
Patented Jan. 28, 1964

3,119,507
ELECTRIC TOOL
Burnell O. Burritt, Detroit, Mich., assignor to Huck Manufacturing Company, Detroit, Mich., a corporation of Michigan
Filed Oct. 19, 1961, Ser. No. 146,239
7 Claims. (Cl. 218—43)

This invention relates to a tool for setting fasteners.

More specifically, the device of this invention is an electric tool for setting fasteners of the type comprising a hollow sleeve with a pin extending therethrough which is settable by means of a relative axial force applied between the pin and the sleeve.

It is common practice to set the fasteners of the above described type by means of a hydraulically, pneumatically or manually operated tool. With the ready availability of electrical energy, it would be advantageous to provide a tool for setting fasteners of the above described type which is operable from electrical energy. Therefore, it is an object of this invention to provide an electrically operated tool for setting fasteners of the above described type.

In the application of fasteners to a pair of workpieces, usually a hole is first drilled through the workpieces of a size to accept the fastener to be set. This requires the use of a separate tool for drilling purposes. It is an object of this invention to provide a tool which is capable of both drilling the hole to accept the fastener and for setting the fastener.

Power actuated tools for setting fasteners of the above described type have means for gripping the pin and applying an axial force thereto. The gripping means is movable to a forward position to accept the pin of the fastener and to a rearward position to set the fastener. In the rearwardmost position the gripping means is at a distance from the pin of the fastener and can grip the pin only upon forward actuation. One problem encountered in power actuated tools for setting fasteners is that in practice the operator often attempts to engage the pin of a fastener without regard as to the position of the gripping means. Thus, with such practice, it is possible that, with the gripping means in its rearwardmost position, the pin can be inserted into the tool at an angle such that upon actuation of the tool and movement of the gripping means forwardly towards the pin, the pin is jammed within the tool, thus causing damage to the tool itself. Therefore, it is an object of this invention to provide a power-actuated tool for setting fasteners of the above described type in which means are provided whereby positioning of the pin of the fastener angularly within the tool is prevented.

It is a further object of this invention to provide a power-actuated tool for setting fasteners of the above described type in which means are provided whereby the gripping means is automatically returned to its forward position to readily accept the pin of the fastener and to thereby prevent the positioning of the pin angularly thereto within the tool.

Further objects, features and advantages of this invention will become apparent from a consideration of the following description, the appended claims and the accompanying drawings, in which:

FIGURE 1 is a side elevational view of a tool embodying the features of this invention with some of the parts shown broken away and some parts in section and shown in conjunction with a nose assembly partially shown in phantom;

FIGURE 2 is a sectional view of the tool of FIGURE 1 taken substantially along the line 2—2;

FIGURE 3 is a sectional view of the tool of FIGURE 1 taken substantially along the line 3—3;

FIGURE 4 is a view of the tool as shown in FIGURE 2 taken substantially along the line 4—4;

FIGURE 5 is a sectional view taken along the line 5—5 of FIGURE 7 which is a front elevational view of the tool of FIGURE 1;

FIGURE 6 is a sectional view of the tool as shown in FIGURE 3 taken substantially along the line 6—6;

FIGURE 7 is a front elevational view of the tool as shown in FIGURE 1;

In general, the tool of this invention is generally designated by the numeral 11 and comprises an electric motor assembly 10 (FIGURE 1) for converting electrical energy into rotational energy which is connected to a gear reduction assembly generally indicated by the numeral 12 (FIGURES 1, 2 and 3) for providing a reduction in the speed of rotation from the electric motor assembly 10. The gear reduction assembly 12 is in turn connected to a translational conversion assembly 14 (FIGURES 1, 2 and 4) which converts the rotational motion of the gear reduction assembly 12 into translational energy. Connected to the translational conversion assembly 14 is an axial motion assembly 16 (FIGURES 2 and 5) which is connected to the translational conversion assembly 14 in order to transmit an axial force to the nose assembly 17 (shown in phantom lines in FIGURES 1, 4 and 5). In order to prevent the insertion of the pin of the fastener angularly with respect to the means for gripping the pin, a position sensing assembly 18 (FIGURE 5) is provided to be operative with the axial motion assembly 16 such that the axial motion assembly 16, and hence the gripping means in the nose assembly 17, will be always returned to substantially the same axially forward position for the reception of a new fastener.

More specifically, then, and looking now to FIGURE 1, the electric motor assembly 10 has a hollow body member 20 which terminates at one end in a handle portion 22 for manually gripping the tool 11 and has secured thereto by conventional means a trigger 24 for the actuation of the electric motor assembly 10 by means well known in the art. Secured within the hollow body member 20 are a plurality of circumferentially disposed field coils and poles 26 constructed by means well known in the electrical motor art. Secured also the body member 20 and extending radially inwardly are a plurality of brush assemblies 28 which are in peripheral contact with a commutator portion 30 of an armature assembly 32. The plurality of field coils 26, the brush assemblies 28 and the armature assembly 32 are electrically energized by actuation of the trigger member 24 through conventional electric circuit means (not shown) and provide rotation of the armature assembly 32 in accordance with well known principles of electrical theory.

The armature assembly 32 terminates at its axially rearward end in a reduced diameter shaft portion 35 which is rotatably disposed within a bearing member 36 secured within the body member 20. At the axially opposite or forward end of the armature assembly 32 is a reduced diameter shaft portion 38 which terminates in a gear portion 40. The shaft 38 is rotatably disposed within a bearing member 42 which is housed within a recess in a generally radially extending rear plate member 44 which is secured to a hollow housing member 46. The rear plate member 44 and housing member 46 are secured to the body 20 by conventional and well known means.

The gear portion 40, which rotates at the speed of the armature 32 of the electric motor assembly 10, is connected to the gear reduction assembly 12 and is in toothed engagement with a large diameter gear member 48 (FIGURES 1 and 3). Secured coaxially upon the same shaft with the enlarged diameter gear 48, is a reduced diameter gear member 50 which in turn is in toothed engagement with a second large diameter gear member 52 (FIGURE 6) which is keyed to a worm shaft 54 (FIGURE 3). The gears 48 and 50 are rotatably secured upon a common shaft by bearings 49 and 51 disposed in the rear plate member 44 and housing member 46, respectively (FIGURE 6).

The worm shaft 54 is rotatably mounted at axially opposite ends in bearings 48 and 58 which are held within the rear plate 44 and the housing member 46, respectively. A worm portion 60 is located intermediate the ends of the worm shaft 54 and is in engagement with a worm gear 62 which is rotatably secured at opposite axial end portions 63 and 65 by bearings 64 and 66, respectively (FIGURE 2). Eccentric with and disposed intermediate relative to the end portion 65 and the worm gear 62 is an annular eccentric portion 68 which serves a purpose to be described. Thus, it can be seen that the rotation of the gear portion 40 secured to the armature member 32 at a given angular velocity results in a reduced angular velocity of the enlarged diameter gear member 48 which, in turn, results in even a further reduction in angular velocity to the worm shaft 54 via the reduced diameter gear 50 and the second enlarged diameter gear 52. A further reduction in angular velocity is effectuated via the engagement of the worm shaft 60 with the worm gear 62 resulting in a desired magnitude of angular velocity of the eccentric portion 68 about the axes of the end portions 63 and 65. Note that by proper selection of gear ratios, the desired speed of rotation of the eccentric portion 68 is attained. It should be noted that the ratios are selected such as to not only provide for the desired speed of rotation of the eccentric portion 68, but to also provide for a desired speed of rotation of the worm shaft 54 for a purpose to be described.

The eccentric portion 68 is rotatably disposed within a slidable block member 70 which is slidably disposed within an elongated slot 72 of a pivot member 74. The pivot member 74 has a reduced section 76 having curved end portions 78 to facilitate pivoting and/or rocking within a slot 81 defined by a slotted member 83 which is secured to the housing 46. The pivotable member 74 is rotatably secured at its opposite end from the reduced section portion 76 to a threaded block member 80 by means of a bore 82 into which is disposed a journal portion 84, having a generally circular cross-section, of the threaded block member 80. An annular bearing member 86 is located between the bore 82 and the journal portion 84 to facilitate relative rotation therebetween. The threaded block member 80 has a threaded bore 88 into which is threadably disposed a shaft 90 which, in turn, has a rear portion 92 slidably disposed within a bore 94 axially extending through a rear portion of the housing 46 and a forward portion 96 slidably disposed within a bore 98 in a removable nose attachment member 100 which is threadably engageable within a threaded bore 102 disposed at the forward end of the housing 46. Secured in a counterbore at the rear portion of the bore 94 is an oil seal 104, while located in a groove in the forward portion 96 is an O-ring member 106 which provides a seal with the bore 98. Thus, dirt, etc., is maintained outside and oil is maintained within the housing 46.

Looking now to FIGURES 2, 4 and 5, as the eccentric portion 68 is rotated, it moves the slidable block member 70 through a circular path; the block member 70 is held from rotation about the axis of the eccentric portion 68 by, and slides within, the slot 72, thereby causing the pivotable member 74 to pivot or rock forwardly and rearwardly within the slot 81 and also causing the shaft 90 to be moved axially reciprocably within the bores 94 and 98 via the rotatable connection between the journal 84 and the bore 82 in the threaded block member 80. Note that, as the shaft 90 moves forwardly and rearwardly, the pivotable member 74 moves vertically (as viewed in FIGURE 4) within the slot 78.

A forward end 108 of the shaft 90 is threaded for attachment to an axially movable collet member 107 of a nose assembly 109 (partially shown in phantom), constructed by means well known in the art for gripping and setting a fastener of the type described above. The casing 111 of the nose assembly 109 is securable to the nose attachment member 100 by means of lugs or ears 113 extending from the outer casing of the nose assembly and engageable within a diametrically slotted, forwardly disposed bore 110 (FIGURES 5 and 7). The collet member 107 is associated with a chuck jaw assembly (not shown) which is operable by well known means to grip the pin of the fastener. With the casing 111 of the nose assembly 109 secured to the nose attachment member 100 via the bore 110 and with the axially movable collet 107 of the nose assembly secured to the shaft 90, means are provided to effectuate relative axial motion to the nose assembly 109 such as to provide means to grip the pin of the fastener and apply a relative axial force between it and the collar to thereby set the fastener. Thus, it can be seen that the rotation of the armature 32, which results in rotation at a reduced speed of the eccentric portion 68, causes a pivoting or rocking action of the pivotable member 74, which in turn effectuates axial motion of the shaft 90 to thereby provide an axial force for setting a fastener in a conventional manner. Conventionally the fastener is set upon the rearward axial movement of the shaft 90.

With the fastener set, the operator releases the trigger 24, causing the rotation of the armature member 32 to stop, hence stopping the axial movement of the shaft 90. It can be appreciated that the final position of the shaft 90 and, hence, the final position of the means for gripping the pin of the fastener relative to a new fastener to be set, will depend upon the exact time the operator releases the trigger 24. Thus, it is possible for the shaft 90 to place the collet member 107 in a position whereby the pin of a new fastener can be inserted angularly within the nose assembly 109; upon actuation of the trigger 24 and movement of the shaft 90 in an axially forward direction, the collet member 107 with the means for gripping the pin is jammed against the skewed pin, resulting in damage to the nose assembly 109. In order to prevent this from occurring, a sensing assembly 18 (FIGURE 5) is provided.

The sensing assembly 18 comprises an adjustment shaft 112 which has an enlarged slotted head portion 114 disposed in an enlarged bore 116 and has a reduced diameter portion 118 rotatably disposed within a reduced diameter bore 120 and extends into the housing 46. The adjustment shaft 112 is held from axial relative movement by means of a ring or bushing member 122 disposed within the enlarged bore 116 and engageable with the head portion 114. An O-ring 117 disposed within a groove in the enlarged head portion 114 provides an oil seal between the adjustment shaft 112 and the bore 116 in the housing 46. At the end of the adjustment shaft 112 which extends into the housing 46 is an auxiliary inwardly extending bore 124 into which is slidably disposed a threaded pin member 126. The threaded pin member 126 has a head portion 128 and an axially extending slot adjacent the head 128 which receives a pin 130 for rotatably securing the threaded pin member 126 to the adjustment shaft 112; of course, because of the slot, the pin member 126 is able to move axially into the bore 124. A nut member 132 is threaded partially upon the threaded pin 126 and is in engagement with one end of a preloaded coil spring member 134. The other end of the spring member 134 is in engagement with a spring seat 136 which is internally in abutment with the housing 46. The spring member 134 via the nut 132 urges the threaded pin 126 axially outwardly from the bore 124 with the head 128 engaging the pin 130. The threaded pin member 126 extends in clearance relationship through a bore 138 located in a bottom portion 137 of the threaded block member 80. A flat surface 139 on the threaded block member 80 is radially engageable with the nut 132 for preventing rotation of the nut 132 and defines with the bottom portion 137 a shoulder 141 which is axially engageable with the nut 132. The threaded pin member 126 has its end opposite the enlarged head 114 engageable with a lever member 140 which is pivotably secured to a cover plate 47 secured to the rear plate member 44 internally of the housing 46. In a chamber 142 in the cover member 44, which is sealed from oil, etc., from the internal portion of the housing 46 by means of the cover plate 47, is disposed a switch member 144 which is actuable by a spring-type trip mechanism 146. The spring-type trip mechanism 146 is biased in a direction away from the switch 144 to maintain the contacts of the switch 144 in an open position. The switch 144 is connected by means of the conductors 148 to parallel the manually operated switch 24 for a purpose to be presently seen. A contact pin 150 is disposed in a bore 151 in the cover plate 47 and is urged outwardly therefrom by means of the engagement of the spring-type trip mechanism 146 with a reduced diameter portion 143 which extends into the chamber 142. A seal 145 is disposed within bore 151 to seal the chamber 142. As shown in FIGURE 5, the threaded pin member 126 is urged by the spring 134 with a sufficient force into engagement with the lever member 140 to thereby move the contact pin 150 against the bias of the spring-type trip mechanism 146 so as to move the trip mechanism 146 in a direction toward the switch 144 to close the switch 144. The shoulder 141 of the threaded block member 80 is axially engageable with the nut member 132 in a preselected forward position of the shaft 90 to thereby move the threaded shaft 126 axially into the bore 124 and out of contact with the lever member 140 to thereby allow the spring-type trip mechanism 146 to open the contacts of the switch 144. Thus in operation, assuming that the operator actuates the tool 11 by means of closing the trigger 24, the shaft 90 is moved axially rearwardly in a manner previously described to set the fastener. Assuming, then, that the operator releases the trigger 24 with the shaft 90 in its axially rearward position, the shoulder 141 of the threaded block 80 is out of axial engagement with the nut member 132, hence allowing the threaded pin 126 to engage the lever member 140, closing the contacts of the switch 144, thus maintaining the energization of the armature 32. The axially forward motion of the shaft 90 continues until the nut member 132 is axially engaged by the shoulder 141 of the threaded block 80, moving the threaded pin 126 out of engagement with the lever member 140, allowing the switch 144 to open, thereby stopping the rotation of the armature 32.

The location of the nut member 132 along the threaded pin 126 is set to allow for movement due to inertia of the moving parts of the tool 11 such as to bring the shaft 90 to a predetermined position, moving the collet member 107 and the means for gripping the pin member to a forwardly predetermined position. Adjustment of this forward position is provided by changing the axial location of the nut member 132 by means of rotation of the adjustment shaft 112 which causes rotation of the threaded pin 126 and causes an axially forward or rearward movement of the nut member 132, depending upon the adjustment to be made.

Thus, with the tool as shown and described, means are shown for converting electrical rotational energy into translational energy for applying a relative axial force to a nose assembly for setting a fastener. Means are also shown whereby the final position of the shaft 90, after the setting of the fastener, is selected and set. Additional means for determining the final position of the shaft member 90 is shown in FIGURE 1 where the armature member 32 is depicted to be axially offset from the plurality of poles 26. Upon energization of the armature 32 and of the plurality of poles or field windings 26, a solenoid action urges the armature 32 axially forward, or to the left, as shown in FIGURE 1. An annular spring washer 153 is provided in axial alignment with the bearing 42 such that movement of the armature 32 axially against the bearing 42 causes compression of the spring washer 153. Upon the de-energization of the armature 32 and of the field windings 26, by the release of the trigger 24 and by the opening of the switch 144, the spring member 153 urges the bearing 42 axially rearwardly, or to the right as shown in FIGURE 1, hence moving the armature 32 axially rearwardly until the rear face 152 adjacent the commutator portion 40 is forced into engagement with a reaction bracket 154. The rear face 152 is coated with a frictional material such that, upon engagement with the reaction bracket 154, a braking action is caused to occur, tending to stop the rotation of the armature 32 and, hence, to stop the axial movement of the shaft 90. It is to be noted that the latter frictional means for stopping the armature 32 can be utilized independently of the sensing assembly 18 for bringing the tool 11 to rest more rapidly after the setting of a given fastener. Used, however, in conjunction with the sensing assembly 18, it provides a means whereby variations in the final position of the shaft 90 are minimized. For example, the inertia of the internal parts of the tool 11 may vary, depending on whether the tool 11 has been actuated to set a fastener or actuated without setting a fastener. These differences are then minimized by means of the solenoid action, as previously described, in conjunction with the frictional means to cause rotation of the armature 32 and, hence, axial movement of the shaft 90 to cease.

It was previously mentioned that the speed of the worm shaft 54 is provided to be at a preselected speed for a purpose. Note that the end of the worm shaft 156 extending through the outer bearing 58 is extendable beyond the bearing 58. A cap 158, which is held to the housing 46 by means of a chain 160, is threadably removable from an enclosing position about the end 156 of the worm shaft 54 (FIGURE 7). The tip of the portion 156 of the worm shaft 54 is provided with an aperture or bore 162 which is adapted to receive a drill member (not shown) having a mating shape to facilitate being held within the bore 162. Thus, by removing the threaded cap 158 from the enclosing position over the shaft portion 156, a drill can be inserted into the bore 162 and, upon actuation of the tool 11 by means of the trigger 24, rotation of the drill can be facilitated to drill a hole. The cap 158 is provided to cover the shaft 156 so as to prevent possible injury to the operator which might occur if the shaft were left exposed. Thus it can be seen that the tool 11 has facility for first, drilling a hole through a pair of workpieces and, then, for applying a fastener within the drilled hole.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a tool for setting fasteners having a pin and a sleeve and being set by the application of a relative axial force therebetween and including a nose assembly having a body member and gripping means movable axially relative to the body member for gripping the pin of the fastener, said tool comprising a body assembly, electric motor means disposed in said body assembly for providing rotational energy responsively to energization by a source of electrical energy, circuit means connected to said electric motor means for selectively connecting said electric motor means to the source of electrical energy, and conversion means disposed in said body assembly connected to the gripping means of the nose assembly and being operatively associated with said electric motor means for converting the rotational energy of said electric motor means into translational energy and for applying an axial force to the gripping means of the nose assembly, said conversion means including a shaft assembly connected to the gripping means of the nose assembly and axially movably disposed in said body assembly, a pivotable member having a longitudinally extending slot and having one end pivotably disposed in said body assembly and having an opposite end rotatably connected to said shaft assembly and being movable pivotably for axially moving said shaft assembly, a block member slidably disposed in said slot in said pivotable member, and a rotatable shaft being rotatable by said electric motor means and having an eccentric portion rotatably disposed within said block member for rotating said block member about the axis of said rotatable shaft and sliding said block member in said slot.

2. In a tool for setting fasteners having a pin and a sleeve and being set by the application of a relative axial force therebetween and including a nose assembly having a body member and gripping means movable axially relative to the body member for gripping the pin of the fastener, said tool comprising a body assembly, electric motor means disposed in said body assembly for providing rotational energy responsively to energization by a source of electrical energy, circuit means connected to said electric motor means for selectively connecting said electric motor means to the source of electrical energy, conversion means disposed in said body assembly connected to the gripping means of the nose assembly and being operatively associated with said electric motor means for converting the rotational energy of said electric motor means into translational energy and for applying an axial force to the gripping means of the nose assembly, said conversion means including a shaft assembly connected to the gripping means of the nose assembly and axially movably disposed in said body assembly, a pivotable member having a longitudinally extending slot and having one end pivotably disposed in said body assembly and having an opposite end rotatably connected to said shaft assembly and being movable pivotably for axially moving said shaft assembly, a block member slidably disposed in said slot in said pivotable member, a rotatable shaft being rotatable by said electric motor means and having an eccentric portion rotatably disposed within said block member for rotating said block member about the axis of said rotatable shaft and sliding said block member in said slot, and speed reduction means connecting said electric motor means to said conversion means for reducing the angular velocity from said electric motor means to said conversion means, said speed reduction means including a worm shaft having a worm thread and having an aperture at one end whereby a tool may be received.

3. In a tool for setting fasteners having a pin and a sleeve and being set by the application of a relative axial force therebetween and including a nose assembly having a body member and gripping means movably axially relative to the body member for gripping the pin of the fastener, said tool comprising electric motor means including an armature for providing rotational energy responsively to energization by a source of electrical energy, circuit means connected to said electric motor means for selectively connecting said electric motor means to the source of electrical energy, said circuit means including switch means selectively actuable for continuously connecting said electric motor means to said source of electrical energy and further including auxiliary switch means actuable independently of said switch means for connecting said electric motor means to the source of electrical energy, means including a shaft assembly connected to the gripping means of the nose assembly and being operatively associated with said electric motor means for converting the rotational energy of said electric motor means into translational energy and for applying an axial force to the gripping means of the nose assembly, frictional engagement means engageable with said armature responsively to deenergization of said electric motor means for bringing said armature to rest, and sensing means operatively associated with said circuit means for actuating said auxiliary switch means and for maintaining said switch means actuated until said shaft assembly reaches a predetermined axial position.

4. In a tool for setting fasteners having a pin and a sleeve and being set by the application of a relative axial force therebetween and including a nose assembly having a body member and gripping means movable axially relative to the body member for gripping the pin of the fastener, said tool comprising a body assembly, electric motor means disposed in said body assembly for providing rotational energy responsively to energization by a source of electrical energy, said electric motor means including a plurality of field windings, an armature urged by a spring member to an axially offset postion relative to said field windings and movable to an axially aligned position relative to said field windings upon energization of said field windings, said armature having a frictional surface on one end being engageable with said body assembly with said armature in said axially offset position, circuit means connected to said electric motor means for selectively connecting said electric motor means to the source of electrical energy, said circuit means including switch means selectively actuable for continuously connecting said electric motor means to said source of electrical energy and further including auxiliary switch means actuable independently of said switch means for connecting said electric motor means to the source of electrical energy, means disposed in said body assembly including a shaft assembly connected to the gripping means of the nose assembly and being operatively associated with said electric motor means for converting the rotational energy of said electric motor means into translational energy and for applying an axial force to the gripping means of the nose assembly, and sensing means operatively associated with said circuit means for actuating said auxiliary switch means and for maintaining said switch means actuated until said shaft assembly reaches a predetermined axial position.

5. In a tool for setting fasteners having a pin and a sleeve and being set by the application of a relative axial force therebetween and including a nose assembly having a body member and gripping means movable axially relative to the body member for gripping the pin of the fastener, said tool comprising a body assembly, electric motor means disposed in said body assembly for providing rotational energy responsively to energization by a source of electrical energy, said electric motor means including a plurality of field windings, an armature urged by a spring member to an axially offset position relative to said field windings and movable to an axially aligned position relative to said field windings upon energization of said field windings, said armature having a frictional surface on one end being engageable with said body assembly with said armature in said axially offset position, circuit means connected to said electric motor means for selectively connecting said electric motor means to the source of electrical energy, conversion means disposed in said body assembly connected to the gripping means of the nose assembly and being operatively associated with said electric motor means for converting the rotational energy of said electric motor means into translational energy and for applying an axial force to the gripping means of the nose assembly, said conversion means including a shaft assembly connected to the gripping means of the nose assembly and axially movably disposed in said body assembly, a pivotable member having a longitudinally extending slot and having one end pivotably disposed in said body assembly and having an opposite end rotatably connected to said shaft assembly and being movable pivotably for axially moving said shaft assembly, a block member slidably disposed in said slot in said pivotable member, a rotatable shaft being rotatable by said electric motor means and having an eccentric portion rotatably disposed within said block member for rotating said block member about the axis of said rotatable shaft and sliding said block member in said slot, speed reduction means connecting said electric motor means to said conversion means for reducing the angular velocity from said electric motor means to said conversion means and including means for receiving a rotatable tool and for applying a rotational motion to the rotatable tool responsively to actuation of said electric motor means, and sensing means operatively associated with said circuit means for maintaining said electric motor means energized by said source of electrical energy until said shaft assembly reaches a predetermined axial position.

6. In a tool for setting fasteners having a pin and a sleeve and being set by the application of a relative axial force therebetween and including a nose assembly having a body member and gripping means movable axially relative to the body member for gripping the pin of the fastener, said tool comprising electric motor means including an armature for providing rotational energy responsively to energization by a source of electrical energy, circuit means connected to said electric motor means for selectively connecting said electric motor means to the source of electrical energy, said circuit means including switch means selectively actuable for continuously connecting said electric motor means to said source of electrical energy and further including auxiliary switch means actuable independently of said switch means for connecting said electric motor means to the source of electrical energy, connecting means including a shaft assembly connected to the gripping means of the nose assembly and being operatively associated with said electric motor means for converting the rotational energy of said electric motor means into translational energy and for applying an axial force to the gripping means of the nose assembly, frictional engagement means engageable with said armature responsively to deenergization of said electric motor means for bringing said armature to rest, and sensing means operatively associated with said circuit means for actuating said auxiliary switch means and for maintaining said switch means actuated until said shaft assembly reaches a predetermined axial position, said connecting means including a worm shaft having a worm thread and having an aperture at one end whereby a tool may be received.

7. In a tool for setting fasteners having a pin and a sleeve and being set by the application of a relative axial force therebetween and including a nose assembly having a body member and gripping means movable axially relative to the body member for gripping the pin of the fastener, said tool comprising a body assembly, electric motor means disposed in said body assembly for providing rotational energy responsively to energization from a source of electrical energy, means connected to said motor means for selectively connecting said motor means to the source of electrical energy, conversion means disposed in said body assembly connected to the gripping means of the nose assembly and being operatively associated with said motor means for converting the rotational energy of said motor means into translational energy and for applying an axial force to the gripping means of the nose assembly, said conversion means including a shaft assembly connected to the said gripping means of the nose assembly and axially movably disposed in said body assembly, a pivotable member having a longitudinally extending slot and being pivotably connected between said body assembly and said shaft assembly for axially moving said shaft assembly, and a rotatable shaft being rotatable by said motor means and having an eccentric portion operably connected with said slot of said pivotable member for pivoting said pivotable member on rotation of said rotatable shaft.

References Cited in the file of this patent

UNITED STATES PATENTS

| | | |
|---|---|---|
| 2,075,162 | Begg | Mar. 30, 1937 |
| 2,406,949 | Huck | Sept. 3, 1946 |
| 2,694,781 | Hinz | Nov. 16, 1954 |
| 2,965,258 | Wilson | Dec. 20, 1960 |
| 3,032,667 | Sorchy | May 1, 1962 |
| 3,033,410 | Hanneman | May 8, 1962 |